United States Patent
Zhu et al.

(10) Patent No.: US 12,277,371 B2
(45) Date of Patent: Apr. 15, 2025

(54) DYNAMIC CURRENT MODELING IN DYNAMIC VOLTAGE DROP ANALYSIS

(71) Applicant: ANSYS, INC., Canonsburg, PA (US)

(72) Inventors: Deqi Zhu, San Jose, CA (US); Yu Lu, San Ramon, CA (US); Wei Zhou, Chengdu (CN); Kunhua Ma, Chengdu (CN); Norman Chang, Fremont, CA (US); Prabhas Ranjan Kumar, Fremont, CA (US); William Alan Mullen, Cupertino, CA (US)

(73) Assignee: ANSYS, INC., Canonsburg, PA (US)

( * ) Notice: Subject to any disclaimer, the term of this patent is extended or adjusted under 35 U.S.C. 154(b) by 1021 days.

(21) Appl. No.: 16/948,058

(22) Filed: Aug. 28, 2020

(65) Prior Publication Data
US 2022/0067255 A1 Mar. 3, 2022

(51) Int. Cl.
*G06F 30/3308* (2020.01)
*G06F 119/06* (2020.01)
*G06F 119/10* (2020.01)

(52) U.S. Cl.
CPC ...... *G06F 30/3308* (2020.01); *G06F 2119/06* (2020.01); *G06F 2119/10* (2020.01)

(58) Field of Classification Search
CPC .......... G06F 30/3308; G06F 2119/06; G06F 2119/10; G06F 30/27; G06F 30/33; G06F 30/20
See application file for complete search history.

(56) References Cited

U.S. PATENT DOCUMENTS

| | | | |
|---|---|---|---|
| 11,409,932 B1 * | 8/2022 | Wan | G06F 30/367 |
| 2017/0193151 A1 * | 7/2017 | Foreman | G06F 30/398 |
| 2019/0108301 A1 * | 4/2019 | Chhabra | G06F 30/367 |

OTHER PUBLICATIONS

Bountas et al. "A macromodel technique for VLSI dynamic simulation by mapping pre-characterized transitions" 2008 IEEE International Conference on Computer Design, Lake Tahoe, CA, USA (Year: 2008).*

* cited by examiner

*Primary Examiner* — Rehana Perveen
*Assistant Examiner* — Troy A Maust
(74) *Attorney, Agent, or Firm* — WOMBLE BOND DICKINSON (US) LLP (57) ABSTRACT

Circuit design techniques can use a trained predictor to predict key dynamic current metrics (such as peak current, peak time, pulse width and total charge) for a gate in a circuit library, where the predictor has been trained over different combinations of different input transition slews and different output fanout models. A dynamic current model solver can be used for a gate in the cell library to derive waveforms (of current versus time) for the different combinations, and a predictor, such as a neural network, can be trained with the outputs from the solver for the different combinations. The trained predictor can be used in a runtime simulation to solve for the dynamic current demand model of the various gates in a circuit design (such as all of the gates in an integrated circuit).

20 Claims, 9 Drawing Sheets

DYNAMIC CURRENT MODELING IN DYNAMIC VOLTAGE DROP ANALYSIS

BACKGROUND

This description relates to computer based techniques for dynamically simulating power consumption and power grid noise in integrated circuits.

Power grids in modern integrated circuits (ICs) provide power to gates, such as circuit elements, within the IC via a power distribution network of conductors. The size and quantity of these conductors are determined during the design of the IC so that the power distribution network can provide adequate power during use of the IC, particularly when many circuits within the IC are switching between states. Designers of ICs typically use software tools to design the IC and simulate the design in the software before the IC is fabricated. These simulations can avoid fabricating a defective or poor design by testing different designs, such as different power distribution networks, before fabrication of the IC. Designers often use dynamic current prediction models to verify that a power distribution network in the IC will work reliably. The models can be used to perform dynamic voltage drop analysis and electromigration analysis. These models, however, require enormous computational resources to perform detailed analyses in a reasonable amount of time for modern designs that include millions of gates in the designs.

SUMMARY OF THE DESCRIPTION

The embodiments described herein can generate a predictor from a large set of possible combinations of inputs (e.g., transition slew times and fanout models) to a gate from a cell library so that the predictor can predict results based on a large set of training data, making the predictions more accurate, and the predictor can also produce predicted outputs quickly, thereby reducing the computational resources (and improving the operation of a computer) that are needed to generate a dynamic current analysis for a design of a circuit such as a complex integrated circuit. These embodiments can be used during characterization of the dynamic current behavior of the different cells within a library, and these characterizations can be used during the design of circuits by users of the library. The embodiments described herein can also use adaptive clustering of instances of a cell in the design to reduce computations without unduly impacting the accuracy of the analysis. The embodiments described herein can also avoid clustering instances of a cell that have heavily shielded capacitive loads that are shielded by resistive loads at the output of the cells. Thus, clusters can be used where their use does not impact unduly the accuracy of the analysis and the use of clusters can be avoided in those cases (e.g., the heavily shielded instances) where their use would unduly impact accuracy in the simulation results.

In one embodiment, a method performed by a data processing system can include the following operations: obtaining, from a data source for a circuit, dynamic current data that represents a current versus time waveform for the circuit; obtaining different boundary conditions that include combinations of different input transition slews and different output fanout models; performing calculations with a dynamic model solver to get a current versus time waveform for each combination for the circuit; computing waveform metrics derived from the dynamic model solver for each combination; and generating a predictor from the waveform metrics for use during runtime simulations of circuits which use the circuit. In one embodiment, the data source is a cell library, and the circuit is a gate in the cell library. In one embodiment, the predictor can be generated by a polynomial fit generator that fits one or more polynomial equations to waveforms represented by the waveform metrics. In another embodiment, the predictor, once generated, can comprise a neural network that is trained using the waveform metrics to predict current versus time waveform data for the gate.

In one embodiment, the method can further include the operations: determining one or more clusters of instances of the gate in a circuit design based on one or more of: pulse width, peak current, peak time, and accumulated charge for the instances; and determining a representative set of waveform metrics for each of the one or more clusters, the representative set of waveform metrics for a cluster comprising values for peak current, peak time, and accumulated charge (over time). In one embodiment, the representative set is derived from a centroid instance in the cluster, and wherein in a runtime of a simulation, the representative set of waveform metrics for a gate within the cluster is used for any gate within the cluster to compute a demand current model for the gate in a design. In one embodiment, the representative set of waveform metrics is stored without storing other waveform metrics from instances of the gate in the cluster. In one embodiment, the cluster can be determined by using an adaptive threshold based on relative peak current, peak time and accumulated charge over a plurality of instances of the gate, and wherein one form of an adaptive threshold can compress the data more by producing fewer clusters. The adaptive threshold can be varied by the designer to provide more accuracy in simulation outputs (and hence smaller and more clusters) or to provide more compression by having larger clusters and potentially fewer clusters (while potentially reducing accuracy).

In one embodiment, clustering is avoided for instances of the gates that are determined to be driving capacitive loads through resistive loads that cause the current waveform's pulse width to exceed a threshold value; thus, such instances are not clustered together. In this case, each of these instances (that are not clustered) will be solved using the trained predictor, where the input values for the instance are applied as inputs to the trained predictor to obtain output values for that particular instance (as opposed to the centroid instance if the heavily shielded instance had been clustered with a centroid instance). This approach provides improved accuracy for such heavily shielded instances while providing improved computational speed for those instances (that are not heavily shielded instances) that are clustered into a cluster. The clustering allows a runtime simulation to use the same output from the predictor for all clustered instances (without having to repeatedly compute the outputs for each instance in the cluster); in other words, dynamic current behavior for any instance in the cluster (assuming the instance is not heavily shielded) can be obtained using the outputs for the representative instance (e.g., centroid instance).

In one embodiment, the trained predictor can be included with software distributed to licensees who design ICs and who use the software to create dynamic power models of their design and then perform simulations using the software to determine power grid noise, dynamic voltage drop analyses and electromigration analyses.

The embodiments described herein can be implemented in data processing systems, such as data processing systems that include a non-transitory machine readable medium that stores an executable computer program described herein.

The aspects and embodiments described herein can include non-transitory machine readable media that can store executable computer program instructions that when executed cause one or more data processing systems to perform the methods described herein when the computer program instructions are executed. The instructions can be stored in non-transitory machine readable media such as in dynamic random access memory (DRAM) which is volatile memory or in nonvolatile memory, such as flash memory or other forms of memory.

The above summary does not include an exhaustive list of all embodiments are aspects in this disclosure. All systems, media, and methods can be practiced from all suitable combinations of the various aspects and embodiments summarized above and also those disclosed in the detailed description below.

BRIEF DESCRIPTION OF THE DRAWINGS

The present invention is illustrated by way of example and not limitation in the figures of the accompanying drawings in which like references indicate similar elements.

DETAILED DESCRIPTION

Various embodiments and aspects will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments.

Reference in the specification to "one embodiment" or "an embodiment" means that a particular feature, structure, or characteristic described in conjunction with the embodiment can be included in at least one embodiment. The appearances of the phrase "in one embodiment" in various places in the specification do not necessarily all refer to the same embodiment. The processes depicted in the figures that follow are performed by processing logic that comprises hardware (e.g. circuitry, dedicated logic, etc.), software, or a combination of both. Although the processes are described below in terms of some sequential operations, it should be appreciated that some of the operations described may be performed in a different order. Moreover, some operations may be performed in parallel rather than sequentially.

Figure 1:
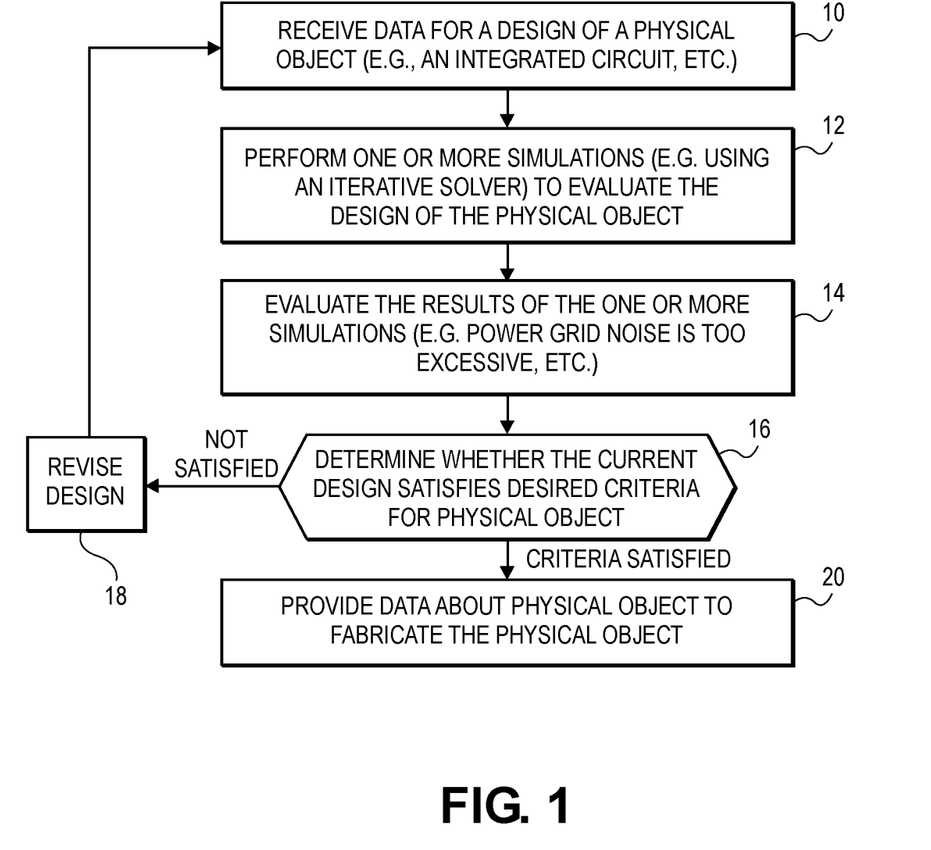
FIG. 1 is a flowchart which illustrates a method which can be used according to one or more embodiments described herein to design an integrated circuit (IC) and simulate the operation of the IC prior to fabricating the IC.

The embodiments described herein can be used in simulations of electrical circuits (for example, an IC) in order to determine whether a particular design of the circuit satisfies particular requirements for the circuit or system containing the circuit. For example, there might be certain design requirements for a power distribution network in the IC. FIG. 1 shows a method in which these design requirements can be tested relative to a particular design of an IC or physical system which is being simulated. In operation 10 of FIG. 1, a data processing system can receive data about a design for a particular IC or other electrical circuit. The data can be created in CAD software on a data processing system, and the data can include information about the gates to be used to fabricate the IC, such as cell library information about the gates, etc. Then in operation 12, the data processing system can perform one or more simulations (such as simulations based on dynamic current models) to evaluate the design of the IC. These simulations can use the aspects and embodiments described herein. In one embodiment, the data processing system can perform simulations by using an iterative solver which converges upon a solution that specifies parameters relative to the IC in the simulation. For example, the design may be subjected to various different transient input slews during the simulation (and also different fanouts), and information from the simulation may indicate how well or poorly the particular design of the power distribution network performs, such as the amount of noise on the distribution network, etc. In operation 14, the designer can evaluate the results of one or more simulations to determine whether the design of the IC satisfies certain desired criteria for the design. This determination is shown in operation 16. If the one or more criteria is satisfied, then the designer in operation 20 can provide data about the circuit to allow the fabrication or manufacture of the IC or system. For example, if the one or more criteria is satisfied, a CAD file can be produced that describes how to build the IC or system. If the criteria are not satisfied as determined in operation 16, the designer can revise the design in operation 18 (for example, by changing sizes and/or quantity of the power distribution network, etc.) and repeat the process by performing additional further simulations to evaluate the redesigned circuit. This can be repeated until the desired criteria are achieved for the circuit.

As is known in the art, the resistance, inductance and capacitance (RLC) of the interconnect(s) at the output of a gate or cell in a circuit has a dominant impact on the noise of the power distribution network (also referred to as a power grid). The noise on the power grid, if excessive, can impact the proper functioning of gates by causing the generation of improper or incorrect signal states at the output of gates or cells in the design. The gate or cell, as is known in the art can be a standard component in a cell library that is used to assemble a circuit, such as an IC. Traditional approaches to estimate power grid noise use an effective capacitance model for interconnect loading, but this is not accurate enough for new designs, especially at smaller device sizes used in modern semiconductor fabrication. The embodiments described herein use an improved approach that can be used during library characterization and following library characterization.

Figure 2A:
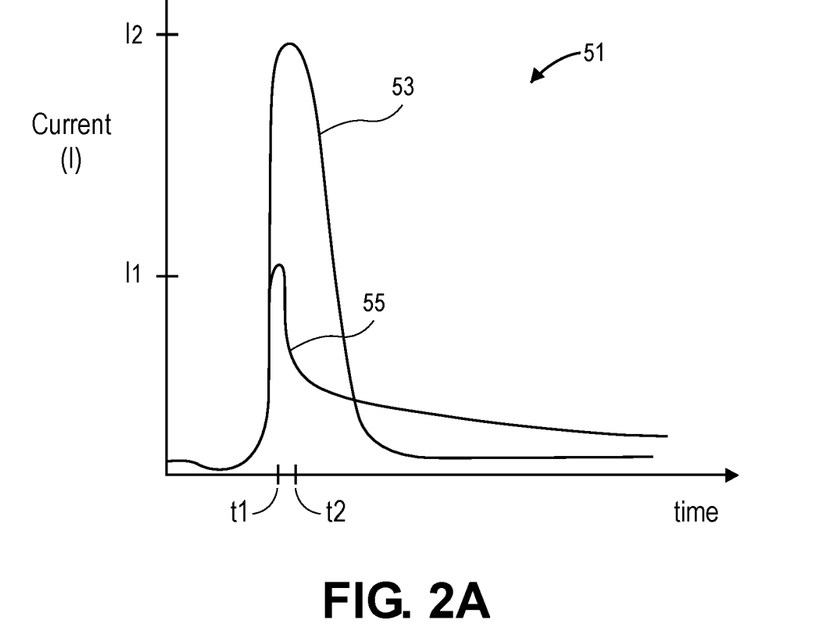
FIG. 2A is a graph that shows the current versus time behavior of a circuit, such as a gate or cell in a cell library, when the input to the circuit switches or transitions between states; as is known in the art, this dynamic current (dynamic in that it changes over time) has an impact on the power distribution network that supplies power to the circuit.

FIG. 2A shows an example of the behavior of a gate when its input transitions from one signal level to another (e.g., from low to high). The x axis of the graph 51 represents time after a transition, and the y axis represents current after the transition. The gate will draw a momentarily high current after the transition, and a curve on the graph can represent that drawn current over time. The peak of the current and the time of the peak can be characterized from the curve, and also the pulse width can be characterized from the curve. Also the total accumulated charge (in effect, the area under the I versus time curve) can also be characterized. As shown in FIG. 2A, the gate being characterized can have 2 behaviors; curve 53 represents a gate without a heavily shielded output (described further below) and the curve 55 represents a gate with a heavily shielded output. The curve 53 has a peak current of I2 at time t2; the curve 55 has a peak current of I1 at time t1. The curve 55 has a larger pulse width than the curve 53's pulse width. The charge (also referred to as accumulated charge) for each curve can be derived from the area under the respective curve. As is known in the art, the cell in the library can be characterized using a pi model shown in FIG. 2B.

Figure 2B:
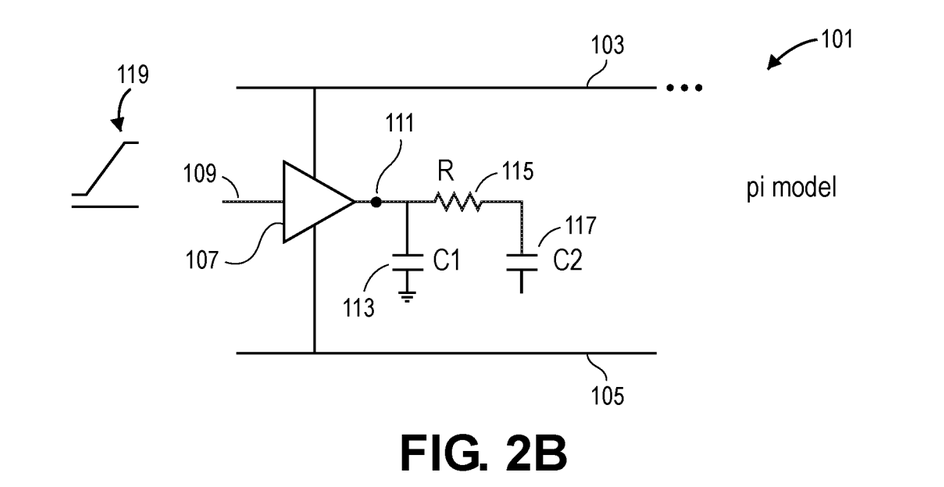
FIG. 2B shows an example of a circuit model that can be used to represent the circuit that undergoes the transition between input states.

Referring now to FIG. 2B, a circuit 101 shown in FIG. 2B represents a gate or cell in a cell library, and the circuit includes a gate 107. Power is supplied to the circuit 101 through a power grid 103 and 105. The gate 107 has an input interconnect 109 which receives an input signal 119 that can transition from one state (e.g., low) to another state (e.g., high). The speed of this transition can be referred to as a transition time or slew rate. The output interconnect 111 from the gate 107 drives a load that is modeled with two capacitances 113 and 117 (C1 and C2) and a resistance 115 (R). Different fanout models (representing different loads) can be created by providing different values for the capacitances 113 and 117 and different values for the resistance 115; these different fanout models can be used in the embodiments described herein (e.g., see FIG. 5A). The transition time or slew rate can also be selected to be different values in the embodiments described herein (e.g., see FIG. 5A).

Figure 5A:
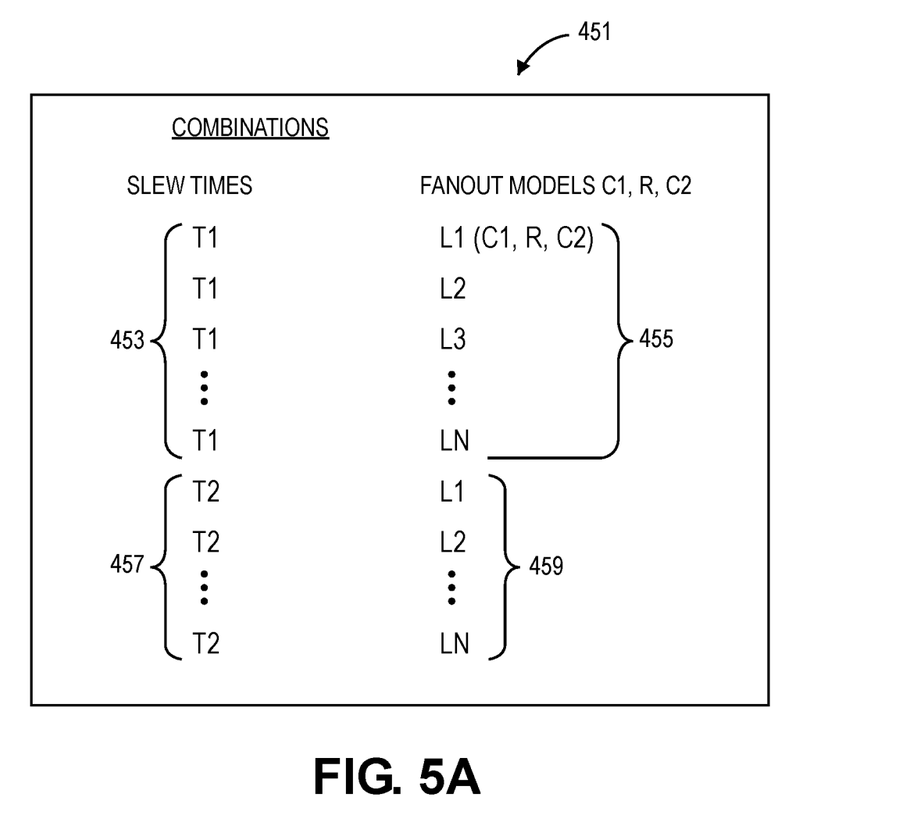
FIG. 5A shows a table of possible combinations that can be used in the methods shown in FIG. 3A or 3B to generate training data for generating the predictor that is created in those methods.

An overview of a method according to one embodiment will now be described while referring to FIG. 3A. In operation 151 shown in FIG. 3A, a data processing system can obtain dynamic current data that represents a current versus time waveform for a circuit (such as the waveform shown in FIG. 2A). For example, the data processing system can obtain dynamic current data for a gate or cell in a cell library which is to be used to construct a circuit design for an integrated circuit. In one embodiment, operation 151 can use the standard cell model information 203 and the cell logic definition 205 shown in FIG. 3B to generate dynamic current data for use in subsequent operations shown in FIG. 3A. In operation 153, the data processing system can obtain different possible boundary conditions that can include different possible combinations of different input transitions (slew rates) and different output fanout models (e.g., different values for C1, R, C2). FIG. 5A shows an example of these different possible combinations of both input transitions and output fanout models that can be obtained. These different possible combinations represent training data that is used in subsequent steps to ultimately compute waveform metrics. Then in operation 155, the data processing system can perform calculations which use a dynamic current model solver to obtain a current versus time representation of a waveform for each combination of the circuit, where each combination was obtained in operation 153.

In one embodiment, the dynamic current model solver can be implemented using one or more embodiments described in U.S. patent application Ser. No. 16/569,684, filed Sep. 13, 2019, and entitled Dynamic Modeling Method For Dynamic Power Noise, which application claims priority to and the benefit of U.S. provisional patent application No. 62/731,171, filed on Sep. 14, 2018; this non-provisional US patent application and this provisional application are incorporated herein by reference. The dynamic current model solver can in one embodiment determine a time series of supply currents to the circuit based on a calculated time series of equivalent load capacitances at the output of the circuit. Further details regarding this dynamic current model solver are provided in the two previously mentioned US patent applications. The output in operation 155 from the dynamic current model solver can be a current versus time waveform for each combination (e.g., each of the combinations shown in FIG. 5A) of the circuit. In operation 157, the data processing system can compute waveform metrics derived from the waveform for each combination that was created by the dynamic current model solver. In one embodiment, the waveform metrics can be a set of four parameters that characterize the waveform of the circuit for each combination; in one embodiment, those four parameters can be: peak current (also referred to as peak), peak current time (also referred to as peak time), charge (also referred to as accumulated charge), and pulse width. Then in operation 159, the data processing system can generate a predictor from the waveform metrics for use during runtime simulations of the circuit. In one embodiment, this predictor can be a set of N polynomial equations which are generated by a regression fit of the waveform metrics to the set of N polynomial equations; in another embodiment, this predictor can be a neural network, such as the neural network shown in FIG. 5B, which is been trained using the waveform metrics to create the predictor. Once generated, the predictor can provide the key current metrics (e.g., peak, peak time, charge, and pulse width) based upon input data provided to the predictor, which input data includes the input transition time (or slew rate) the fanout model (such as C1, R & C2), and the power grid arc of the circuit across the arc of the power grid. Thus, these inputs can be applied to the predictor for particular combination of input values to derive the four parameters of: peak, peak time, charge, and pulse width which can be used during simulations of the circuit, such as simulations involving dynamic voltage drop or other simulations known in the art. This predictor can be integrated into a power cell noise current waveform library from a process that characterizes each cell in the cell library. Thus, the process can be repeated in operation 161 for at least a subset of the gates or cells in the cell library; in one embodiment, the process is repeated for all gates or cells in the cell library to characterize each cell in the cell library with respect to power grid noise. Thus, in one embodiment, the information generated by the method shown in FIG. 3A can be saved with the cell library, and this information can include the generated predictors along with data representing the various combinations which were used to generate the predictor. While the method shown in FIG. 3A represents an overview of an embodiment, the method shown in FIG. 3B provides a more specific example according to one embodiment.

Figure 3A:
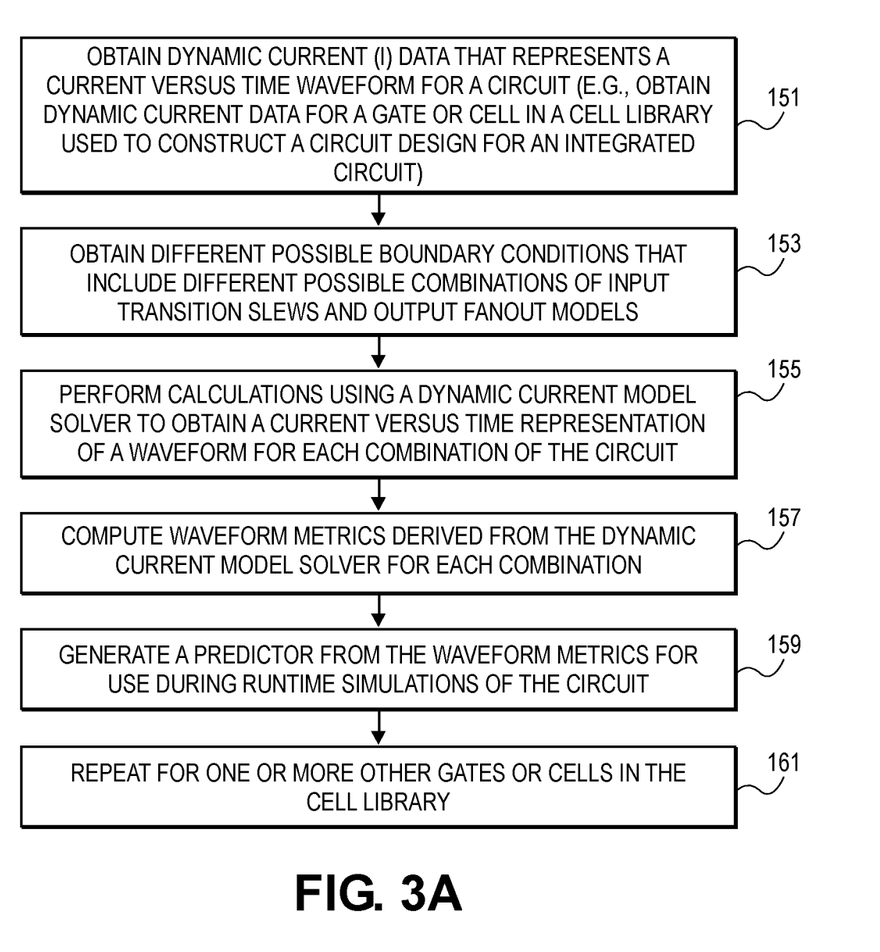
FIG. 3A is flowchart that illustrates a method according to one embodiment.
Figure 3B:
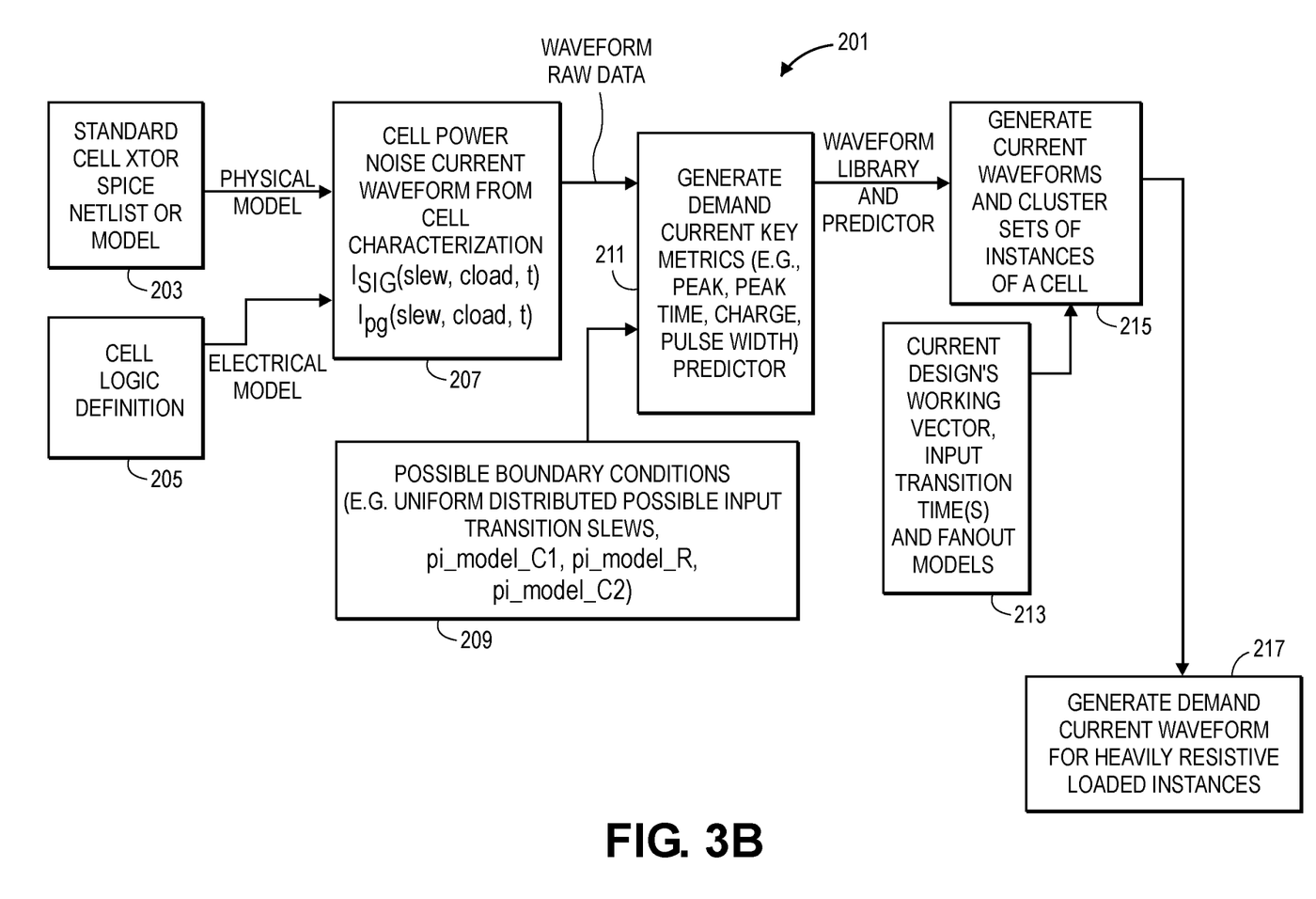
FIG. 3B is a flowchart that illustrates a method according to an embodiment.

Referring now to FIG. 3B, in operation 207, a data processing system can generate a cell power noise current waveform from cell characterization data, where this data can include standard cell netlist or model data 203 and the cell logic definition 205. In one embodiment, operation 207 can use techniques known in the art to generate current (I) waveform data for the cell based upon netlist or model data 203 and the cell logic definition 205. In one embodiment, the netlist or model data 203 can include a SPICE netlist and a SPICE model which are known in the art, and operation 207 can use SPICE simulations that are known in the art to generate the waveform raw data as an output from operation 207, where this waveform raw data from operation 207 can resemble the curve 53 shown in FIG. 2A. This waveform raw data is then used in operation 211 to generate a predictor using the possible boundary conditions 209 which can be similar to the different input combinations shown in FIG. 5A. In one embodiment, operation 211 can include operations 155, 157, and 159 shown in FIG. 3A. In particular, operation 211 can include the use of the dynamic current model solver (described in the above-mentioned two US patent applications) to generate outputs based upon the different combinations 209 and the waveform raw data from operation 207, and these outputs are used to train a predictor in operation 211. Operation 211 in one embodiment can involve training a neural network (such as the neural network shown in FIG. 5B) to predict the key metrics of peak, peak time, charge, and pulse width based upon outputs from the dynamic current model solver, and those outputs are based on the waveform raw data and based upon the different possible boundary conditions such as different possible combinations of transition times and different output fanout models (with various different values for C1, R and C2). In another embodiment, the generation of the predictor can be a regression fitting operation in which N polynomial equations are fitted to the data during the training performed in operation 211. Operation 211 hence produces a trained predictor as well as a waveform library, and the trained predictor and the waveform library can be saved with the cell library and provided to a circuit designer who uses the cell library to design an integrated circuit. In another embodiment, a circuit designer can use one of the embodiments described herein to characterize a cell library and then use the characterized cell library to design circuits. Further information about an embodiment of operation 211 is provided in FIG. 4A and its associated description.

The circuit designer can use the waveform library and the predictor from operation 211 to simulate demand current for the design using operations 213, 215 and 217. Thus operations 213, 215 and 217 can be part of runtime simulations conducted by the designer of the circuit for a particular design that uses gates or cells from the cell library that has been characterized by the predictor and the waveform library. In operation 213 the designer can, for each cell from the library that is used in the design, get all instances of the cell in the design and obtain all possible input transition times and fanout load models (e.g., C1, R, C2) and then use the predictor, in operation 215, to predict the demand current key metrics for all instances across every combination. In one embodiment, the predictor in the data processing system provides, for each instance of a cell in the design, the four key current metrics (peak, charge, peak time, and pulse width) for each of the combination of inputs (such as power grid arc of the cell, transition time and fanout load models).

Operation 215 in one embodiment can also group or cluster instances of a cell based upon the key current metrics such as peak and charge and optionally pulse width and peak time that are provided by the predictor in operation 215. This clustering is described further below in conjunction with FIGS. 4B, 4C and 4D. In one embodiment, the clustering is based on the outputs from the predictor as opposed to the inputs to the predictor; this improves the accuracy of the clustering by allowing the system to cluster based upon the outputs (e.g., peak, peak time, charge and pulse width) from the predictor in operation 215. In one embodiment, the system can selectively exclude, in operation 217, instances of a cell from a cluster when those instances drive heavily shielded capacitive loads (which are shield by large resistances). If an instance is selectively excluded, the system can compute, using the predictor, the demand current metrics (e.g., peak, peak time, charge, and pulse width) for the excluded instance as opposed to using a representative instance within the cluster (such as a centroid instance within the cluster) to provide values for the excluded instance. This selective exclusion is described further below in conjunction with FIGS. 4C and 4D.

Figure 4A:
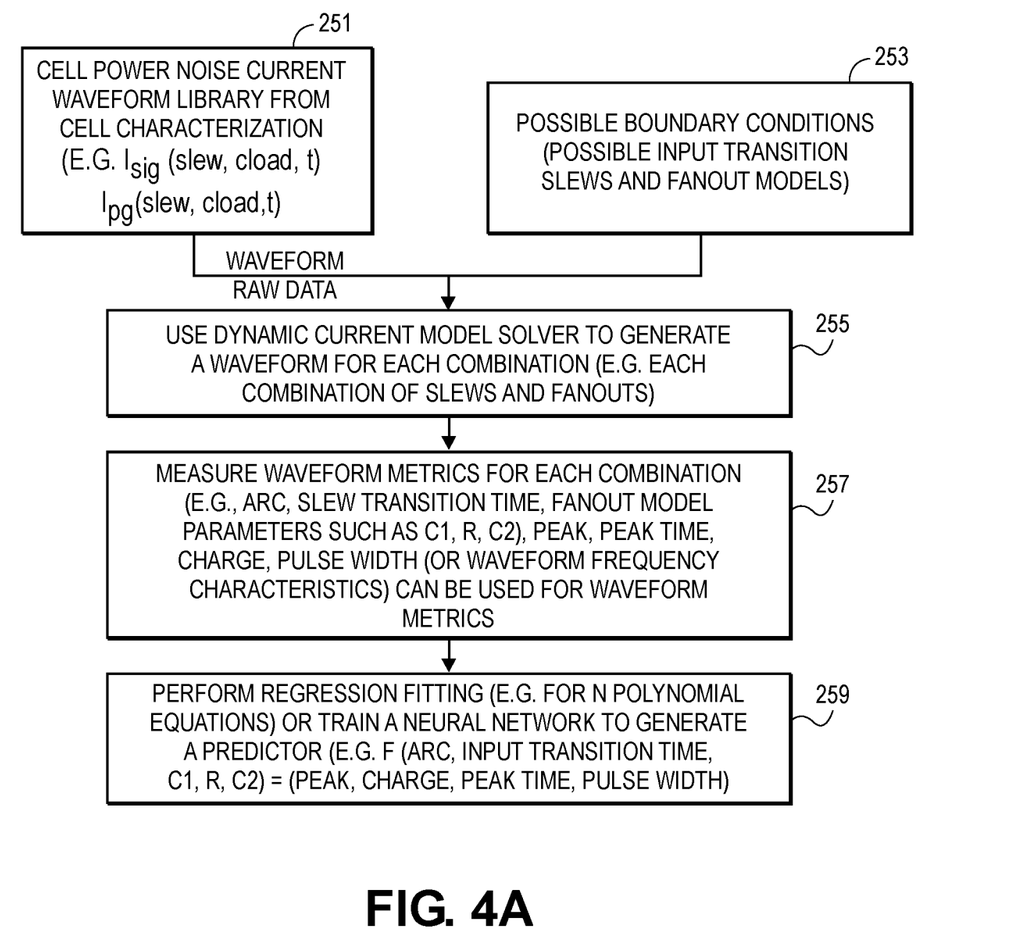
FIG. 4A is a flowchart that shows a method for generating a predictor according to one embodiment.

The methods shown in FIGS. 3A and 3B included the generation of a predictor of demand current metrics for use in dynamic current simulations of a circuit design. FIG. 4A provides a further description of an embodiment that generates such a predictor. In one embodiment, operations 251 and 253 shown in FIG. 4A can be similar to operations 207 and 209 shown in FIG. 3B; in particular, operation 251 can involve the characterization of a cell in a cell library to generate waveform raw data. Operation 253 can involve the generation of all possible boundary conditions which can include all possible transition times and fanout models (e.g., C1, R, C1). These operations 251 and 253 provide inputs to a dynamic current model solver in operation 255 which generates a waveform for each combination of input data. The input data can be similar to the table in FIG. 5A of input data which includes a large set of combinations of different possible transition times and fanout parameters. The dynamic current model solver can be the dynamic current model solver described in the above-mentioned two US patent applications which are incorporated herein by reference. In operation 255, the dynamic current model solver can generate a set of outputs that can be used in operation 257; the set of outputs can include a waveform for each combination. In operation 257, each waveform can be measured to derive waveform metrics for each combination of input values. In particular, the waveform metrics can be derived for each combination of input values (power grid arc, transition time and fanout model parameters such as C1, R, C2). In one embodiment, the waveform metrics for each waveform can be the parameters: peak current, peak time, charge, and pulse width. These waveform metrics can be saved and in one embodiment the waveforms themselves are not saved. These waveform metrics can then be used in operation 259 to train a predictor.

Figure 5B:
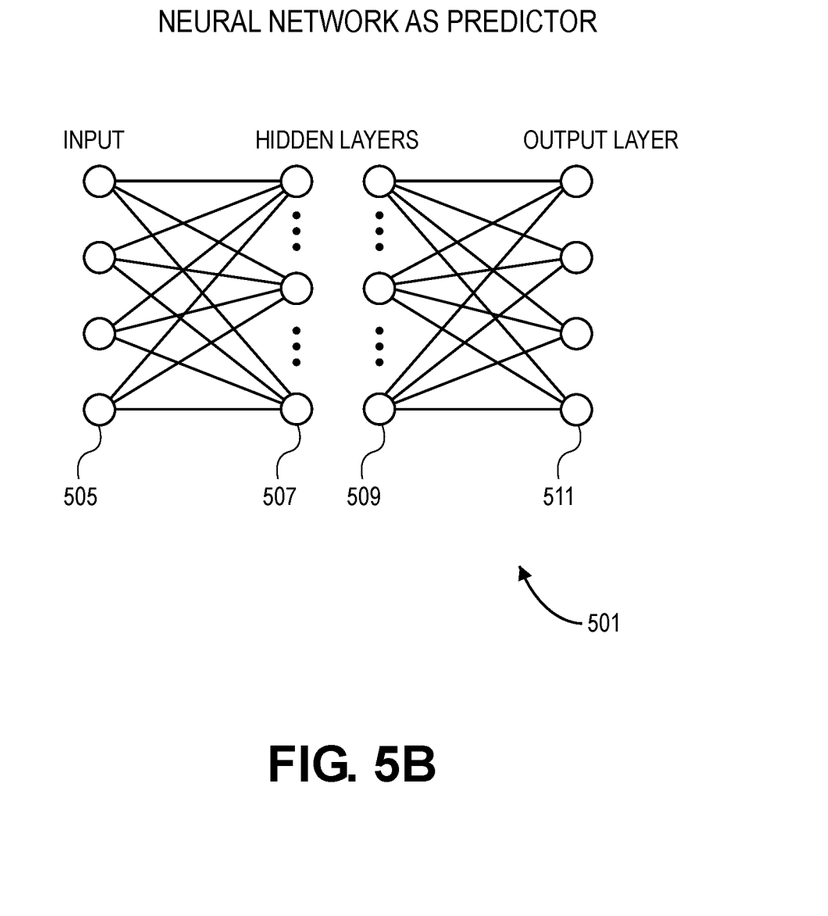
FIG. 5B shows an example of a neural network that can be used to generate the predictors such as the predictors created in the methods shown in FIG. 3A or 3B.

In one embodiment, the training can be performed on a neural network which is trained to receive inputs of power grid arc, input transition time, and fanout parameters (e.g., C1, R, C2) and provide trained outputs of peak current, peak time, charge, and pulse width. The training of a neural network can be performed using conventional techniques that use known desired outputs (used during training to provide corrections of the internal weights within the neural network) so that inputs which are known to generate the known desired outputs cause the trained neural network to generate the correct known desired outputs. FIG. 5B shows an example of a neural network 501 which includes an input layer 505 in an output layer 511 in a set of hidden layers, such as layers 507 and 509, which are coupled through weighted connections to the input layer and the output layer. In one embodiment, the neural network can be multilayer perception implemented as a deep neural network. Once the neural network is trained, it can be saved as the predictor for the cell library. In another embodiment, the predictor can be a set of N polynomial equations that have been fitted to waveforms represented by the waveform metrics provided by operation 257. In this embodiment, conventional polynomial regression techniques can be used to fit the set of N polynomial equations to the waveforms based upon the input data (power grid arc, input transition time, and fanout parameters such as C1, R and C2). The result of operation 259 provides a trained predictor and can also provide a waveform library in the form of waveform metrics which can be stored or saved with the cell library for future use during dynamic voltage drop simulations or other uses of the demand current model provided by the trained predictor.

Figure 4B:
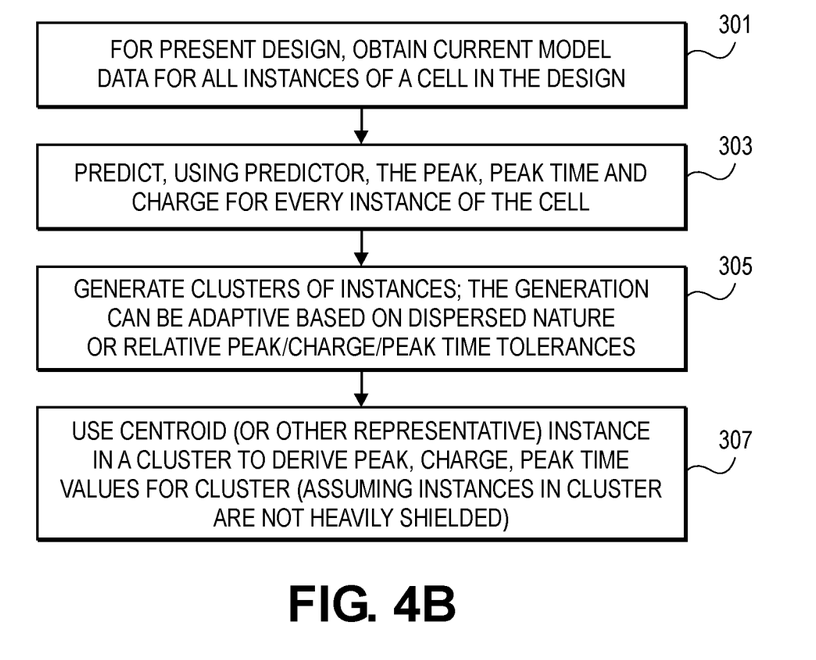
FIG. 4B is a flowchart that shows a method for generating clusters of instances of a cell or gate in a design.

Once a predictor has been generated for a cell library, it can be used by a circuit designer to generate demand current predictions for the entire circuit design (or portion of a circuit design). In one embodiment, these demand current predictions can be used in dynamic voltage drop simulations or can be used in other simulations such as electromigration analysis. FIG. 4B shows an example of a method which can be performed by a circuit designer using the trained predictor provided by the method shown in FIG. 4A or the methods shown in FIG. 3A or 3B. In operation 301 of FIG. 4B, the circuit designer can obtain the current model data for all instances of a cell in the design. This can involve obtaining the input data about the instances of the cells, and the input data can include power grid arc, transition time and fanout model parameters (such as C1, R, and C2) for an instance of a cell in the design. Then in operation 303, a data processing system can predict, using the trained predictor, the peak, peak time, charge and pulse width for every instance of the cell in the design; this use of the predictor is also repeated for the instances of the other cells in the design so that the entire design can be covered. Operation 303 thus produces a set of output values from the predictor for each instance of each cell in the design based on the input data. Then in operation 305, the data processing system can generate one or more clusters of the instances based upon their similarity in these output values. For example, if several instances of a cell have almost the same peak, peak time, charge, and pulse width, they can be grouped together or clustered together into a cluster. In one embodiment, in operation 307, the data processing system can determine a representative value for any instance in the cluster. In one embodiment, this representative value can be a value derived from a centroid instance that is at a centroid location of the cluster. The output values from that centroid instance can be used as the output values for any instance in the same cluster.

Figure 4C:
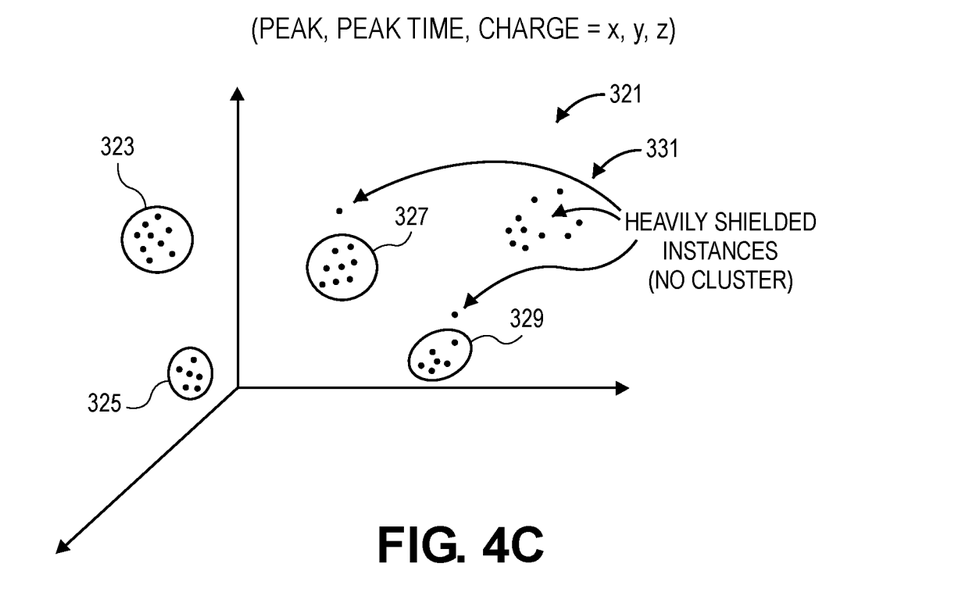
FIG. 4C shows a graph that depicts clusters that were generated or determined from the method shown in FIG. 4B.

FIG. 4C shows an example of how this clustering operation can be performed. In one embodiment, the data processing system can use the centroid instance of each cluster as a representative value for all instances within the cluster. In one embodiment, however, the data processing system can selectively exclude instances from a cluster where those instances are heavily shielded. For example, an instance that drives a capacitive load that is heavily shielded by a large resistance can be selectively excluded from a cluster using, for example, the method shown in FIG. 4D which is described further below. For any instance that remains in a cluster, it's current demand output values, such as peak, peak time, charge, and pulse width can be derived from the representative value rather than recalculating the value for the instance in the cluster. In the example shown in FIG. 4C, a three dimensional plot 321 of the clusters is shown with some heavily shielded instances selectively excluded from clusters, such as the heavily shielded instances 331, while the data processing system has generated four clusters 323, 325, 327, and 329 based on the outputs from the trained predictor in operation 303 in FIG. 4B.

Figure 4D:
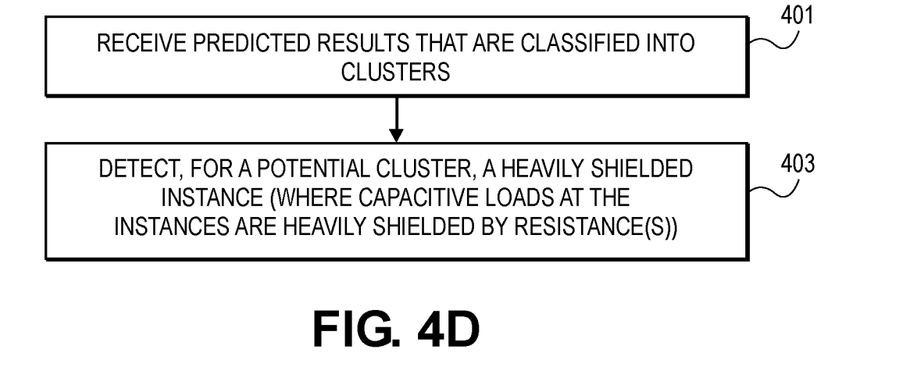
FIG. 4D shows, through a flowchart, a method for detecting heavily shielded instances in one or more clusters.

FIG. 4D shows an example of a method which can be used to selectively exclude instances from a cluster so that those instances that are excluded can be separately and independently processed by calculating their demand current output values, such as peak, peak time, charge, and pulse width based upon their input values for the particular instance; this provides greater accuracy in determining the demand current for such selectively excluded instances. FIG. 2A shows an example of how different the demand current waveform can be for a heavily shielded instance relative to an instance that is not heavily shielded; in particular, the curve 53 is radically different than the curve 55 which is for a heavily shielded instance while the curve 53 is for an instance that is not heavily shielded. This embodiment allows a data processing system to accurately simulate heavily shielded instances while also taking advantage of clustering of instances that are not heavily shielded to provide for more efficient usage of computational resources. In operation 401, the data processing system can receive the predicted results that are classified into clusters. Within each cluster, the data processing system can detect, for a particular cluster, a heavily shielded instance in operation 403. This detection can occur by comparing the predicted pulse width for an instance to a predetermined threshold for a pulse width. If the predicted pulse width for an instance exceeds the predetermined threshold for pulse width, then the instance is classified as a heavily shielded instance and is not compressed into any particular cluster so that the demand current output values for the heavily shielded instance are calculated independently of other instances in the potential cluster. In one embodiment, the predetermined threshold for pulse width can be the minimum of the clock period of that instance or a user defined threshold for pulse width.

Figure 6:
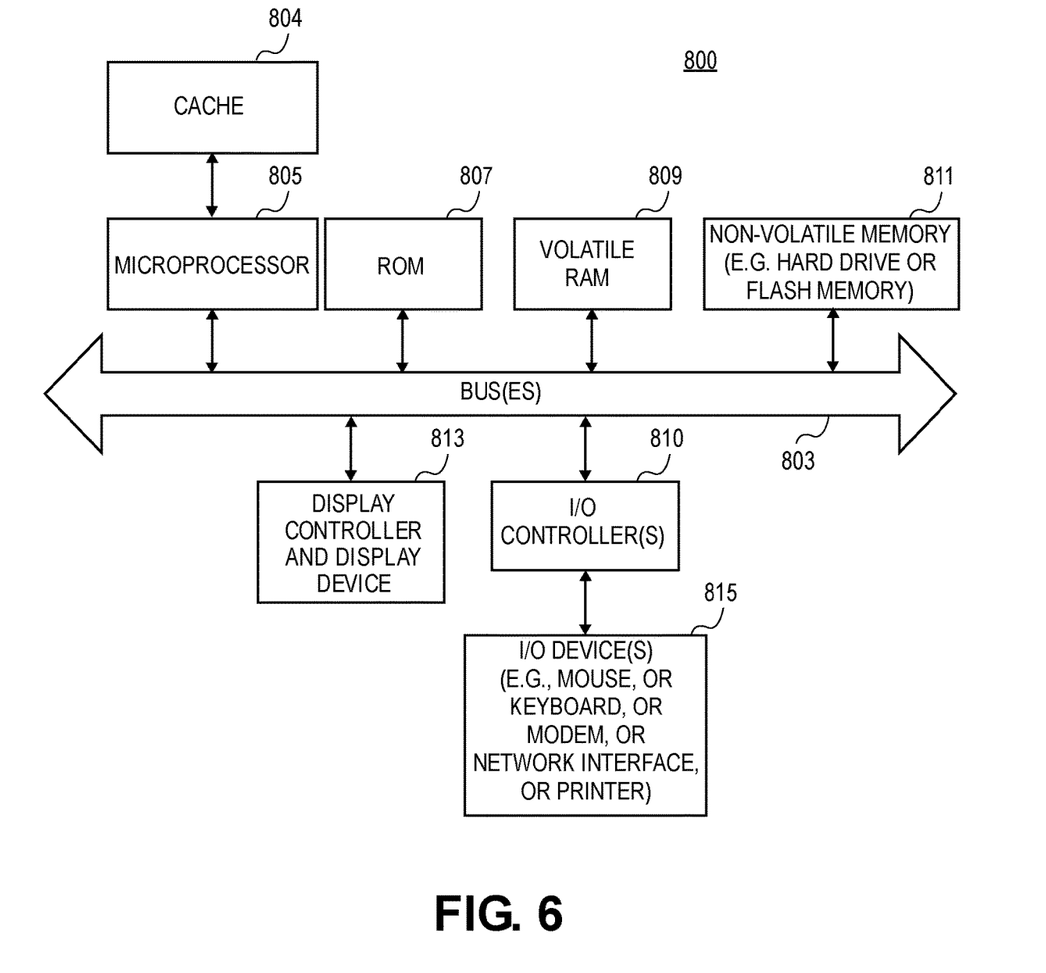
FIG. 6 shows an example of a data processing system that can perform the one or more methods described herein; this example of a data processing system can also be used in runtime simulations that use the predictors and other features described herein.

FIG. 6 shows one example of a data processing system 800, which may be used with one embodiment. For example, the system 800 may be implemented to provide a system or device that performs the method of FIGS. 1, 3A, 3B or other methods described herein. Note that while FIG. 6 illustrates various components of a device, it is not intended to represent any particular architecture or manner of interconnecting the components as such details are not germane to the disclosure. It will also be appreciated that network computers and other data processing systems or other consumer electronic devices, which have fewer components or perhaps more components, may also be used with embodiments of the disclosure.

As shown in FIG. 6, the device 800, which is a form of a data processing system, includes a bus 803 which is coupled to a microprocessor(s) 805 and a ROM (Read Only Memory) 807 and volatile RAM 809 and a non-volatile memory 811. The microprocessor(s) 805 may retrieve the instructions from the memories 807, 809, 811 and execute the instructions to perform operations described above. The microprocessor(s) 805 may contain one or more processing cores. The bus 803 interconnects these various components together and also interconnects these components 805, 807, 809, and 811 to a display controller and display device 813 and to peripheral devices such as input/output (I/O) devices 815 which may be touchscreens, mice, keyboards, modems, network interfaces, printers and other devices which are well known in the art. Typically, the input/output devices 815 are coupled to the system through input/output controllers 810. The volatile RAM (Random Access Memory) 809 is typically implemented as dynamic RAM (DRAM), which requires power continually in order to refresh or maintain the data in the memory.

The non-volatile memory 811 is typically a magnetic hard drive or a magnetic optical drive or an optical drive or a DVD RAM or a flash memory or other types of memory systems, which maintain data (e.g., large amounts of data) even after power is removed from the system. Typically, the non-volatile memory 811 will also be a random access memory although this is not required. While FIG. 6 shows that the non-volatile memory 811 is a local device coupled directly to the rest of the components in the data processing system, it will be appreciated that embodiments of the disclosure may utilize a non-volatile memory which is remote from the system, such as a network storage device which is coupled to the data processing system through a network interface such as a modem, an Ethernet interface or a wireless network. The bus 803 may include one or more buses connected to each other through various bridges, controllers and/or adapters as is well known in the art.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The disclosure also relates to an apparatus for performing the operations described herein. This apparatus may be specially constructed for the required purpose, or it may comprise a general-purpose device selectively activated or reconfigured by a computer program stored in the device. Such a computer program may be stored in a non-transitory computer readable storage medium, such as, but not limited to, any type of disk including floppy disks, optical disks, CD-ROMs, and magnetic-optical disks, DRAM (volatile), flash memory, read-only memories (ROMs), RAMs, EPROMs, EEPROMs, magnetic or optical cards, or any type of media suitable for storing electronic instructions, and each coupled to a device bus.

A machine readable medium includes any mechanism for storing information in a form readable by a machine (e.g., a computer). For example, a non-transitory machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more non-transitory memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)) and then stored in non-transitory memory (e.g., DRAM or flash memory or both) in the client computer.

The preceding detailed descriptions are presented in terms of algorithms and symbolic representations of operations on data bits within a device memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "determining," "sending," "terminating," "waiting," "changing," or the like, refer to the action and processes of a device, or similar electronic computing device, that manipulates and transforms data represented as physical (electronic) quantities within the device's registers and memories into other data similarly represented as physical quantities within the device memories or registers or other such information storage, transmission or display devices.

The processes and displays presented herein are not inherently related to any particular device or other apparatus. Various general-purpose systems may be used with programs in accordance with the teachings herein, or it may prove convenient to construct a more specialized apparatus to perform the operations described. The required structure for a variety of these systems will be evident from the description below. In addition, the disclosure is not described with reference to any particular programming language. It will be appreciated that a variety of programming languages may be used to implement the teachings of the disclosure as described herein.

In the foregoing specification, specific exemplary embodiments have been described. It will be evident that various modifications may be made to those embodiments without departing from the broader spirit and scope set forth in the following claims. The specification and drawings are, accordingly, to be regarded in an illustrative sense rather than a restrictive sense.

What is claimed is:

1. A non-transitory machine readable medium storing executable computer program instructions which when executed by a data processing system cause the data processing system to perform a method, the method comprising:
obtaining, from a data source for a cell in a circuit design, dynamic current data that characterizes the cell;
obtaining different boundary conditions that include combinations of different input transition slews and different output fanout models;
performing calculations with a dynamic model solver to get a current versus time waveform for each combination of input transition slews and output fanout models for the cell based on the dynamic current data;
computing waveform metrics derived from the current versus time waveform calculated for each combination of input transition slews and output fanout models;
generating a predictor from the waveform metrics; and
determining one or more clusters of instances of the cell in the circuit design based on pulse width, peak current, peak time, or accumulated charge for the instances, the predictor and the one or more clusters determined for use during runtime simulation of the circuit design.

2. The medium as in claim 1, wherein the data source is a cell library, and the cell is a component in the cell library.

3. The medium as in claim 1, wherein the predictor, once generated comprises a set of one or more polynomial equations fitted to waveforms represented by the waveform metrics.

4. The medium as in claim 1, wherein the predictor, once generated, comprises a neural network that is trained using the waveform metrics to predict current versus time waveform data for the cell.

5. The medium as in claim 1, wherein the method further comprises:
determining a representative set of waveform metrics for each of the one or more clusters, the representative set of waveform metrics for a cluster comprising values for pulse width, peak current, peak time, or accumulated charge.

6. The medium as in claim 5, wherein the representative set is derived from a centroid instance in the cluster, and wherein in a runtime simulation of the circuit design, the representative set of waveform metrics for the centroid instance within the cluster is used for any cell instance within the cluster to compute a demand current model for the cell instance.

7. The medium as in claim 6, wherein the representative set of waveform metrics is stored without storing other waveform metrics from instances of the cell in the cluster.

8. The medium as in claim 5, wherein determination of the cluster uses an adaptive threshold based on relative peak current, peak time and accumulated charge over time over a plurality of instances of the cell, and wherein wider dispersed peak currents and peak times produce more clusters than narrower dispersed values of peak current and peak time.

9. The medium as in claim 5, wherein instances of the cell that are determined to be driving capacitive loads through resistive loads that exceed a threshold resistive value are not clustered together.

10. The medium as in claim 5, wherein the dynamic model solver determines a time series of supply currents to the cell based on a calculated time series of equivalent load capacitances at the output of the cell.

11. A machine implemented method, the method comprising:
obtaining, from a data source for a cell in a circuit design, dynamic current data that characterizes the cell;
obtaining different boundary conditions that include combinations of different input transition slews and different output fanout models;
performing calculations with a dynamic model solver to get a current versus time waveform for each combination of input transition slews and output fanout models for the cell based on the dynamic current data;
computing waveform metrics derived from the current versus time waveform calculated for each combination of input transition slews and output fanout models;
generating a predictor from the waveform metrics; and
determining one or more clusters of instances of the cell in the circuit design based on pulse width, peak current, peak time, or accumulated charge for the instances, the predictor and the one or more clusters determined for use during runtime simulation of the circuit design.

12. The method as in claim 11, wherein the data source is a cell library, and the cell is a component in the cell library.

13. The method as in claim 11, wherein the predictor, once generated comprises a set of one or more polynomial equations fitted to waveforms represented by the waveform metrics.

14. The method as in claim 11, wherein the predictor, once generated, comprises a neural network that is trained using the waveform metrics to predict current versus time waveform data for the cell.

15. The method as in claim 11, wherein the method further comprises:
determining a representative set of waveform metrics for each of the one or more clusters, the representative set of waveform metrics for a cluster comprising values for pulse width, peak current, peak time, or accumulated charge.

16. The method as in claim 15, wherein the representative set is derived from a centroid instance in the cluster, and wherein in a runtime simulation of the circuit design, the representative set of waveform metrics for the centroid instance within the cluster is used for any cell instance within the cluster to compute a demand current model for the cell instance.

17. The method as in claim 16, wherein the representative set of waveform metrics is stored without storing other waveform metrics from instances of the cell in the cluster.

18. The method as in claim 15, wherein determination of the cluster uses an adaptive threshold based on relative peak current, peak time and accumulated charge over a plurality of instances of the cell, and wherein wider dispersed peak currents and peak times produce more clusters than narrower dispersed values of peak current and peak time.

19. The method as in claim 15, wherein instances of the cell that are determined to be driving capacitive loads through resistive loads that exceed a threshold resistive value are not clustered together.

20. The method as in claim 15, wherein the dynamic model solver determines a time series of supply currents to the cell based on a calculated time series of equivalent load capacitances at the output of the cell.

* * * * *